Patented Oct. 11, 1938

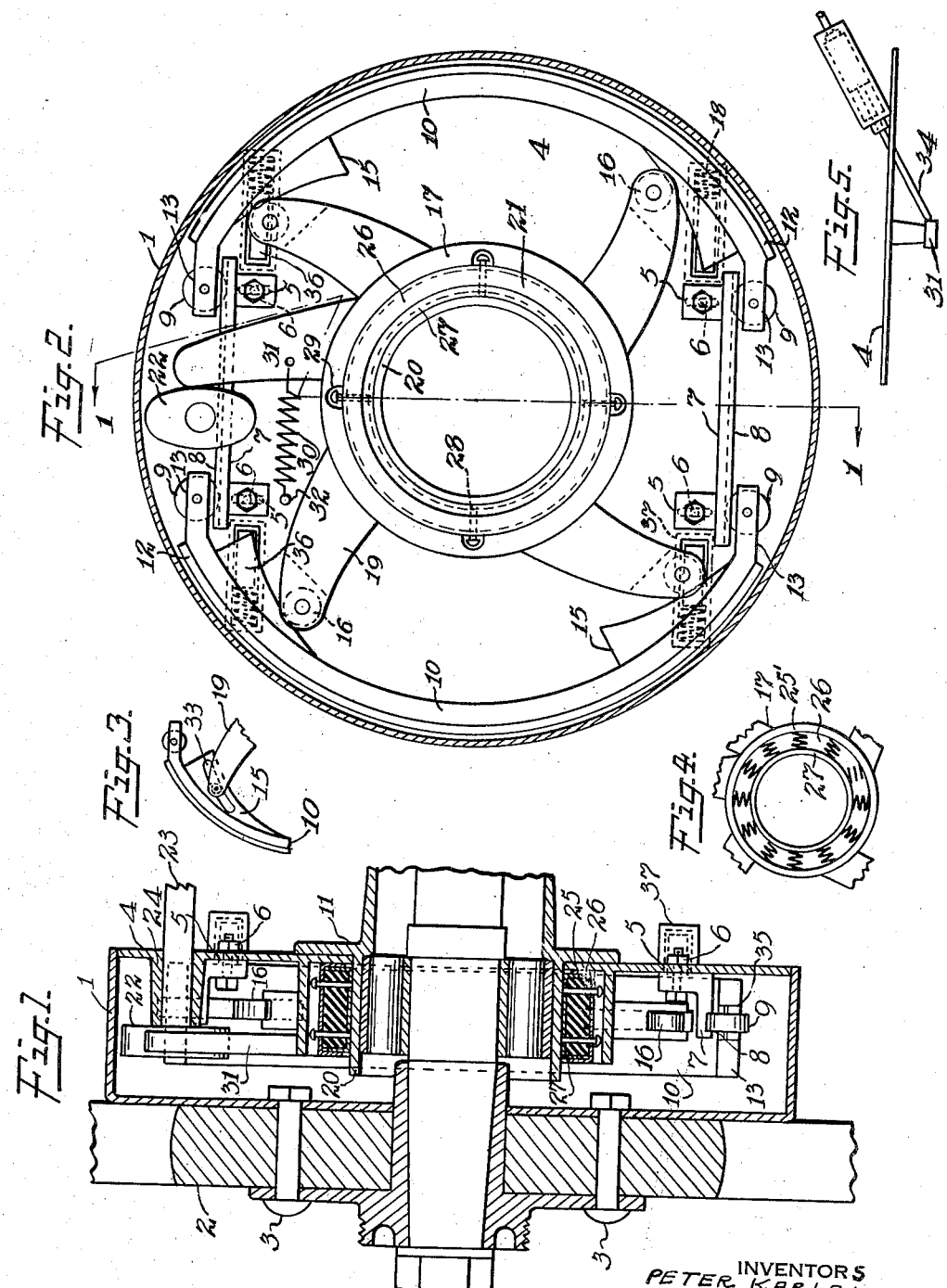

2,132,480

UNITED STATES PATENT OFFICE 2,132,480

BRAKE

Peter Karlak and Arthur O. Stone, Rutherford, N. J.

Application April 3, 1937, Serial No. 134,700

4 Claims. (Cl. 188—78)

This invention relates to brake mechanisms, and more particularly to brakes of the internal expansion type generally used for automotive vehicles.

In brakes of the above type, it is customary practice to establish frictional contact between a plurality of brake shoes having a fabric lining on the acting surface of each shoe, with the inner surface of a revolving steel drum. The latter is carried by the revolving wheel. In order to establish contact the brake shoes are caused to expand radially until the lining is firmly pressed against the drum. The retarding force depends a great deal on the area of contact and the perfect circumferential alignment of each brake shoe with respect to the drum surface. The brake shoes heretofore used were usually pivoted around an eccentric pin at one end, the expanding force acting on the other end thereof. In the above manner, angular motion of the shoe was necessary to establish contact with the drum, and its acting surface diminished toward the pivoted portion. A structure of this type excludes inherently perfect circumferential alignment.

A feature of this invention is the elimination of angular motion of the brake shoes and the provision of means for perfect circumferential alignment between the acting surface of the shoe and the drum.

A marked disadvantage of all brakes of the type above mentioned, employing a plurality of shoes to contact the drum simultaneously, resides in the fact that the pressure exerted on the drum by each shoe may not be at all times equal. This is due to several factors, such as uneven wear of the lining, differences of expansion of the metallic parts by heat, tolerances of production and assembly which often vary within wide limits.

Another, and important feature of this invention is the provision of inexpensive and simple means whereby equalization of pressure between the shoes is automatically established at all times, irrespective of differences caused by wear, heat or assembly tolerances.

These and other features of the invention will become apparent from the following specification, taken in connection with the accompanying drawing in which:

Fig. 1 is a transverse section view of the brake mechanism in accordance with this invention, taken on the plane of the line 1—1 of Fig. 2.

Fig. 2 is a plan view of a brake embodying this invention.

Fig. 3 is a modification of part of the actuating mechanism.

Fig. 4 is a modification of the pressure equalizing means shown in Fig. 2.

Fig. 5 illustrates the application of fluid pressure operation of the brake.

Referring to the accompanying drawing wherein identical reference characters designate identical parts, the description will follow Fig. 2, as the one which illustrates the invention in the greatest detail.

The various figures of the drawing show the invention as applied to the wheel of a motor vehicle. It is to be understood that no restriction of its application is intended thereby, and the illustration is merely by way of example. The invention can be adapted in general to all types of rotating bodies which require frictional brake devices.

It is seen that the brake mechanism consists of the housing or drum 1 which may be mounted upon the wheel 2 of the vehicle by any suitable manner, such as shown by the bolts 3, in Fig. 1. The drum 1 revolves around the axis of the wheel and the inner surface thereof is used for the frictional retardation of motion. Fitting within the brake drum 1 with sufficient clearance to allow motion thereof is a shield plate 4. The latter is stationarily mounted on the axle housing 11, and carries vertically running slots 5, for receiving the anchoring studs 6. The function of the slots 5 will be described in more detail later.

A pair of brake shoes 10 are disposed concentrically within the drum. Each shoe is fitted with a lining 12, of the conventional fabric used generally for automotive brakes. It is to be noted that the shoes 10 are in the shape of an arc, that is semi-circles which follow the curvature of the drum 1. Each shoe 10 is bent at both ends into a flattened portion 13 which is provided with a cut-out 35 to receive the roller 9 which turns around a pin 14 driven into the end portion 13 of the shoe 10. Two supporting brackets 7, each having a grooved surface 8 into which the rollers 9 fit snugly, act as a platform upon which the shoes 10 may slide inwardly or outwardly. In other words, the motion of the shoes 10, towards the drum 1 or receding from it, is uniformly radial at any peripheral point thereon and with equal freedom of movement at both ends thereof. The recessed groove 8 of the bracket 7 holds the shoes firmly by the rollers 9 preventing any co-axial motion which would otherwise cause chattering. The slots 5 in the shield plate 4, previously mentioned, permit exact vertical fitting of the bracket 7, and the support of the shoes 10 in this manner permits a quick and easy assembly. By simply loosening the bolts 6, the brackets 7 may be lowered sufficiently to disengage the rollers 9 from the groove 8 and the removal of a shoe 10, for example for the purpose of replacement, becomes a simple matter.

Each of the brake shoes 10 is provided on its inner surface with a pair of wedge-shaped cams 15 so coordinated as to form a progressively inclined riding surface for the rollers 16 of the star wheel 17. A pair of springs 18, each located in a housing 37 which mounts on the outer surface of the shield plate 4, are so arranged as to press the shoes 10 by the abutment 36 provided on the bottom surface of each cam 15 inwardly and maintain the cams 15 in close contact with the rollers 16. The function of springs 18 will become more apparent in the description of the operation of the brake mechanism.

A star wheel 17 having a plurality of radially extending arms 19, evenly spaced, is rotatably arranged around the axis of the wheel; each of the arms 19 terminates in a roller 16, previously mentioned, which rides over the progressively inclined surface of one of the cams 15. The number of the arms 19 shown here is four inasmuch as there are two cams 15 for each shoe 10. However, this number may vary with different types of brakes depending upon the construction and number of brake shoes employed. Another arm of the star wheel 17, designated as the arm 31, is arranged to engage the two-lobe cam 22, each lobe of the latter functioning as a crank imparting motion to the star wheel 17 by means of the arm 31. The cam 22 is actuated by a cam rock shaft 23, journaled in a bearing 24 suitably secured to the shield plate 4. The shaft 23 extending through the plate 4 serves as the actuating means of the brake and may be coupled to the brake pedal, or lever, not shown here.

The rotatable mounting of the star wheel 17 comprises the inner flange 20 of the axle housing 11 and the spacer ring assembly 21, fitting over said flange and the star wheel 17 in turn fitting over the ring 21. The function of the ring 21 is of utmost importance, it being the means permitting radial pressure equalization between the brake shoes 5. A detailed description of its construction shall be given here.

In the preferred embodiment of this invention, shown in Figs. 1 and 2, the spacer ring assembly 21, comprises a ring 25 in the form of a ring of solid but resilient medium such as rubber, imbedded between telescoping housings 26 and 27 of sheet metal or similar material. The outer housing is sufficiently large in size to fit over and permit the telescoping therein of the inner housing 27. The resiliency of the rubber ring 25 tends to keep the housing 26 and 27 uniformly spaced. A force acting radially on the housing 26 will compress the two housings in such manner, that at the point of pressure, the housing 27 telescopes into the housing 26 and at the point diametrically opposite to the point of pressure, the housing 27 slides out of the housing 26, to an extent proportionate with the telescoping of the housings at the point of pressure. Pins 28 driven through the telescoping housing 26 and the rubber ring 25, fasten securely to the housing 27, whereas the heads of the pins 28 locate in suitable recesses 29 provided in the hub portion of the star wheel 17. The holes in the ring 25 and the outer housing 26 through which the pins 28 pass are sufficiently large to permit free movement of the housing 26 over the housing 27 in a radial sense. The function of the pins 28 is to locate the ring assembly 21 within the hub portion of the star wheel 17 in such a way that both may rotate together without friction between them. In this manner, the ring assembly 21 becomes a semi-integral part of the hub of the wheel 17 riding over the inner flange 20 of the axle housing 11. A tension spring 30 hooks into the arm 31 of the star wheel 17 at one end, while its other end is bent over a pin 32 located in the plate 4. The actuating arm 31 of the star wheel 17 is thereby held against the cam 22.

Let us consider now the operation of the brake mechanism constructed in accordance with this invention.

In Figs. 1 and 2, the brake is illustrated in the open or de-energized position. The mechanical structure of the assembly and the coordination of its elements being of a simple nature, a view showing the energized position has been omitted, inasmuch as anybody skilled in the art can readily visualize the second alternative position.

Rotation of the star wheel 17 in a clock-wise direction is effected by the turning of the two-lobe cam 22 in any direction. The latter as previously stated, is actuated by the shaft 23 connecting with the brake lever, not shown here. Assuming clock-wise rotation of the star wheel 17, the rollers 16 of the arms 19 riding over the cams 15 will force the shoes 10 outwardly against the inner surface of the drum 1. The shoes 10 slide within the grooves 8 of the supporting bracket 7 by means of their rollers 9. The force of the shoes 10 pressing against the drum 1 is progressively augmented with the rollers 16, reaching increased inclination of the cams 15.

Theoretically, with all components being uniform and symmetrical, the radial pressure at any point along the periphery of the brake shoes will be equal to that of all other points. However, in actual practice, theoretical uniformity is impossible even when close tolerances are maintained at increased production costs. Furthermore, in actual use, conceding the attainment of perfect symmetry, uneven wear would shortly disbalance the assembly.

However, in accordance with this invention, means are provided for maintaining effective uniformity and equalization of radial pressure, which comprises the novel support of the star wheel 17, permitting its eccentric allocation automatically in proportion with conditions of asymmetry.

Let us consider, for example, that due to unevenness, irrespective of its cause, one of the shoes 10, be it the one on the left-hand side, contacts the drum 1 before the other shoe. The turning of the cam 22 forces the star wheel 17 and the rollers 16 to ride over the cams 15 of the shoe in question and the latter being already in contact with the drum 1 is prevented from further motion and becomes a transmitter of force, causing the star wheel 17 to move out of its concentric allocation. In this example to the right, the action of the spacer ring 21 now becomes evident. Being compressible, it permits eccentric motion of the star wheel. The housings 26 and 27 telescope and compress the rubber ring 25 at the point of pressure. The shifting of the star wheel 17 to the right—following the example—will immediately press the shoe 10 on the right-hand side, against the drum, until both the shoes press equally against it. Whereupon, the star wheel becomes fixed as far as eccentric motion is concerned.

Upon reverse motion of the cam 22, the star wheel 17 is returned to its original position by the spring 30. Similarly, the brake shoes are repositioned by the springs 18.

Referring to the modification shown in Fig. 3, the repositioning springs 18 are dispensed with and the arm 19 of the star wheel 17, has its roller 16 arranged to slide in a slot 33 provided in the cam 15 of the shoe 10. In this manner, the reverse motion of the star wheel 17 resets the shoes 10. The spring 30, therefore, is of heavier gauge, being the resetting force for all the moving parts.

The modification shown in Fig. 4, refers to the spacer ring 21, in which, instead of the rubber inner ring 25, a plurality of radially disposed springs 25' are arranged within the telescoping sleeves 26 and 27, and act as the resilient medium to permit eccentric displacement of the star wheel 17.

A modification of the actuating means for the star wheel 17 is shown by way of example in Fig. 5. Instead of the two-lobe cam 22 previously described, the actuating arm 31 of the star wheel 17 is positioned directly by the plunger arm 34 of a fluid compression device generally used with hydraulic brake systems.

What is claimed is:

1. In a brake, a revolving drum, a pair of concentrically arranged brake shoes slideably mounted upon supports, said shoes being independently moveable in a radial sense to contact the inner surface of said drum, means for transmitting motive force simultaneously to each shoe, comprising a star wheel having a plurality of arms each adapted to ride over a progressively inclined surface on said shoes, whereby the rotation of said wheel causes radial displacement of said shoes and means for journaling said wheel concentrically with the axis of said drum, said means including a resilient ring support permitting eccentric motion of said wheel.

2. A brake, comprising a rotary brake drum, a shield plate, a pair of brake shoes in concentric alignment with said drum each being in the shape of an arc terminating in inwardly bent portions fitted with rollers, a pair of grooved supporting brackets mounted on said plate and so adjusted as to engage said rollers in said grooves whereby said shoes may slide inwardly and outwardly, spring means urging said shoes inwardly, a pair of cams carried by each of said shoes, a star wheel having a plurality of radially extending arms terminating in rollers engaging said cams, spring means urging one arm of said wheel against a lobed cam, resilient means for journaling said wheel upon the axle housing of said drum including a rubber ring between telescoping members whereby said wheel may be positioned eccentrically to its axis of rotation.

3. In a brake, a star wheel adapted to actuate a plurality of brake shoes simultaneously, means for journaling said wheel upon the axle housing of a rotating body, including a compressible housing in the form of a sleeve placed between the inner flange of said axle housing and the hub of said wheel, said sleeve enclosing a plurality of radially arranged spring members.

4. In a brake, a revolving drum, means for radially moving a plurality of brake shoes, comprising a star wheel rotatably arranged having a plurality of radially extending arms each adapted to engage slots in said shoes, said slots being so coordinated as to form a progressively inclined path for said arms whereby rotation of said wheel in one direction causes outward motion of said shoes and rotation in the opposite direction inward motion thereof, and means for journaling said wheel concentrically with respect to said drum, said journaling means including a resilient ring support permitting eccentric motion of said wheel.

PETER KARLAK.
ARTHUR O. STONE.